Nov. 26, 1957  R. L. PAWSAT  2,814,213
BICYCLE PEDAL
Filed July 13, 1954

INVENTOR.
RUBEN L. PAWSAT
BY
Zugelter & Zugelter
Attys.

United States Patent Office 2,814,213
Patented Nov. 26, 1957

2,814,213

BICYCLE PEDAL

Ruben L. Pawsat, Maysville, Ky.

Application July 13, 1954, Serial No. 443,047

3 Claims. (Cl. 74—594.4)

This invention relates to bicycle pedals and more particularly to bicycle pedals of the type in which a U-shaped frame or bow member is secured to an end plate.

An object of this invention is to provide an improved bicycle pedal of the type having a U-shaped member secured adjacent its ends to an end plate.

A further object of this invention is to provide a pedal of the above character having great strength and long service life which is inexpensive and easy to construct.

A further object of this invention is to provide a pedal of the above character comprised of parts initially identical with parts used heretofore in making similar pedals, but having portions of the bow which project through the end plate crimped in a way which provides a clinched joint having many times the strength of the clinched joints obtained heretofore.

A further object of this invention is to attach the ends of the bow of the pedal to the end plate by crimping the projecting stub tab-like ends of the bow to a flattened U- or V-shaped section in a transverse plane substantially parallel to the plane of the end plate.

The above and other objects and features of this invention will be apparent to those having ordinary skill in the art to which the invention pertains from the following description taken in conjunction with the accompanying drawing in which.

Figure 1:
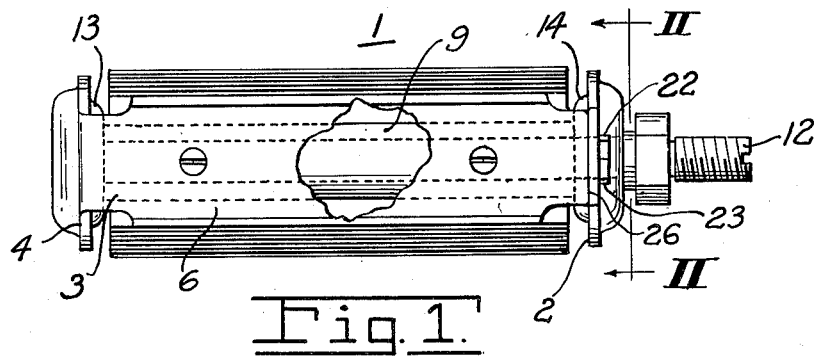
Figure 1 is a view in side elevation of a bicycle pedal constructed in accordance with an embodiment of this invention partly broken away to show structural details.
Figure 3:
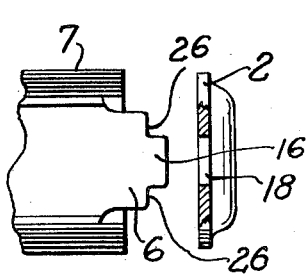
Fig. 3 is an exploded view of a portion of a pedal including an end plate partly in section and the end portion of a bow adapted to cooperate therewith and prior to crimping.

In the drawing is shown a pedal 1 embodying my invention. Pedal 1 includes an inboard end plate 2, and a U-shaped, bow frame member 3. The bow frame member 3 comprises an end plate portion 4 and side members 6. Each side member 6 supports a rubber foot grip 7 of generally I-shape in cross section. The foot grips are held to the side members by bolts 8 and appropriate inner frame members, not shown.

The pedal includes a central tubular frame member 9 (Fig. 1) in which is rotatably mounted a shaft or a spindle 12. The spindle 12 is adapted to be secured to a bicycle pedal arm (not shown) in the usual manner.

The ends of the tubular central frame member 9 carry cup-shaped ends 13 and 14 which bear on the end plates 4 and 2, respectively, and may also co-operate with the end plates to support bearings (not shown) in which the spindle turns.

Figure 2:
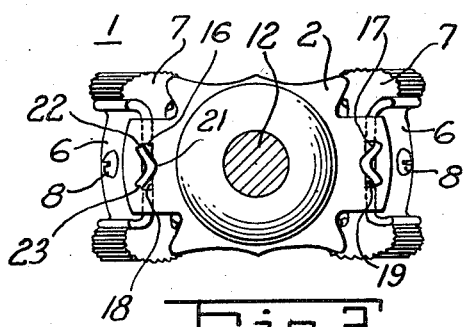
Fig. 2 is a view in section taken on the line II—II in Fig. 1.

The end plate 4 is formed integrally with side members 6. The ends 16 and 17 of side members 6 form relatively wide tongues which project through elongated apertures 18 and 19 in end plate 2 as shown in Figure 2. Each tongue is crimped to a V-shape with the central portion of the crimp extending toward the spindle and with the edges of the tongue being crimped away from the spindle. As shown, tongue 16 has a central portion 21 displaced toward the axis of spindle 12 a distance equal to substantially one-half of the thickness of the tongue. The lateral edge portions 22 and 23 are displaced away from the spindle 12 a distance substantially equal to from one-half to the full thickness of tongue 16. Thus, an end portion of substantially V-shape, is formed having three areas in contact with the inboard end plate 2. The central portion and the edges of the crimped portion of each tongue engage the inboard end plate to hold the end plate tightly against the central frame member 9. The end plate and the bow frame member may be sufficiently resilient to hold the parts tightly and rigidly in assembled relation. Shoulders 26 are provided on the end of each of the side members at the base of the tongue thereof against which the end plate is held by the crimps.

The construction of the connection between the ends of the side members 6 and the end plate 2 is strong and durable and well able to withstand shocks incident to use of the pedal.

The bicycle pedal illustrated in the drawing and described above is subject to structural modification, without departing from the spirit and the scope of the appended claims.

Having described my invention, what I claim as new, and desire to secure by Letters Patent is:

1. A bicycle pedal which comprises a U-shaped bow frame member comprising a plate portion and side members integrally formed with the plate portion, an end plate spanning the ends of the side members, there being spaced elongated apertures in the end plate, a flat plate-like tongue at the end of each side member extending through and substantially filling one of the apertures, a central frame member extending between the end plate and the plate portion of the bow frame member, a V-shaped crimp in each tongue to provide a central crimp portion and spaced edge crimp portions bearing on the end plate to hold the end plate and the plate portion firmly against the ends of the central frame member, the central crimp portion engaging the end plate on one side of the aperture, the edge crimp portions engaging the end plate on the other side of the aperture and a shaft rotatably mounted in the central frame member and projecting from the pedal for attaching the pedal to a bicycle.

2. A bicycle pedal which comprises a U-shaped bow frame member comprising a plate portion and side members integrally formed with the plate portion, an end plate spanning the ends of the side members, there being spaced elongated apertures in the end plate, a flat plate-like tongue at the end of each side member extending through and substantially filling one of the apertures, a central frame member extending between the end plate and the plate portion of the bow frame member, a V-shaped crimp in each tongue to provide a central crimp portion extending toward the central frame member and spaced edge crimp portions extending away from the central frame member and bearing on the end plate to hold the end plate and the plate portion firmly against the ends of the central frame member, the central crimp portion engaging the end plate on one side of the aperture, the edge crimp portions engaging the end plate on the other side of the aperture, and a shaft rotatably mounted in the central frame member and projecting from the pedal for attaching the pedal to a bicycle.

3. A bicycle pedal which comprises a U-shaped bow-frame member comprising an end plate portion and side members integrally formed therewith, a tongue portion projecting longitudinally from each free end of said bow-frame member, a spindle assembly including an end plate having parallel elongated apertures symmetrically perpendicular to a plane containing the longitudinal axis of the spindle, the free ends of said bow-frame member abutting the apertured end plate adjacent the apertures therein, each of said tongue portions projecting through one of said apertures and substantially filling the same with a portion thereof, the portion of each tongue projecting beyond the apertured end plate being crimped to V-trough form by displacement of the center portion of the projecting portion of the tongue toward the spindle a distance substantially equal to one-half the thickness of the tongue and displacing the lateral edge portions of the tongue away from the spindle a distance substantially equal to form one-half to the full thickness of the tongue, said displaced portions overlapping and engaging portions of the apertured end plate whereby said bow-frame member and the apertured end plate are firmly secured together in a fixed relation.

References Cited in the file of this patent

UNITED STATES PATENTS

| | | |
|---|---|---|
| 555,933 | Curtis | Mar. 10, 1896 |
| 582,292 | Krishaw | May 11, 1897 |
| 601,517 | Lavigna | Mar. 29, 1898 |
| 820,095 | Chesterman | May 8, 1906 |
| 2,567,785 | Rieger | Sept. 11, 1951 |

FOREIGN PATENTS

| | | |
|---|---|---|
| 775,902 | France | Oct. 22, 1934 |